United States Patent [19]

Anjos et al.

[11] 4,414,715
[45] Nov. 15, 1983

[54] WIRE GRIP HOSE CLAMP

[75] Inventors: Theodore R. Anjos, Shrewsbury; Robert F. Fay, York, both of Pa.; Robert H. Sebald, Baltimore, Md.; Henry T. Van Egmond, Grosse Pointe Woods, Mich.

[73] Assignee: Murray Corporation, Cockeysville, Md.

[21] Appl. No.: 252,064

[22] Filed: Apr. 8, 1981

[51] Int. Cl.³ .................... A43C 11/08; A44B 13/00
[52] U.S. Cl. ........................................ 24/283; 24/27
[58] Field of Search ................ 24/283, 279, 27, 28, 24/26

[56] References Cited

U.S. PATENT DOCUMENTS

| 470,344 | 3/1892 | Baldwin | 24/283 |
| 649,916 | 5/1900 | Dietrich | 24/279 |
| 2,697,570 | 12/1954 | Snyder | 24/279 |
| 2,899,733 | 8/1959 | Sundberg | 24/279 |
| 4,307,495 | 12/1981 | Sadler | 24/279 |

FOREIGN PATENT DOCUMENTS

| 573698 | 12/1945 | United Kingdom | 24/297 |
| 787188 | 12/1957 | United Kingdom | 24/283 |

Primary Examiner—John J. Wilson
Attorney, Agent, or Firm—Isler & Ornstein

[57] ABSTRACT

A wire grip hose clamp is disclosed, adapted to be applied to a hose by a driving tool having a rotatable socket. The clamp is characterized by having incorporated therein a screw having a relatively long head which is received in said socket, and a base flange formed integrally with said head and of enlarged diameter whereby to provide additional bearing surface for the end of the socket. The base flange has a conical or chamfered surface. These improvements are designed to prevent or minimize any tendency of the socket to become disengaged from the screw during installation of the clamp on the hose. The screw, including the head and flange, are made by forging or cold heading.

4 Claims, 8 Drawing Figures 4,414,715

WIRE GRIP HOSE CLAMP

BACKGROUND OF THE INVENTION

This invention relates, as indicated, to wire grip hose clamps.

Wire grip hose clamps have heretofore been manufactured, in which a slotted screw is employed for closing or tightening the clamp, such screw having a relatively short hex head having a thin circular base flange or washer of relatively small diameter.

The clamp is usually made of a single piece or length of wire, bent or formed to provide circular hose-gripping portions which terminate in free ends or tails which lie adjacent the periphery of the base flange or washer of the screw head, and extend substantially tangentially to the circular hose gripping portions.

In applying such clamps to a hose, a driving tool is used having a socket in which the head of the screw is received and which is rotated to rotate the screw to thereby tighten the clamp on the hose.

It has been found, however, that in the tightening of the screw, there is a tendency of the tool socket to become disengaged from the head of the screw, partly as a result of the fact that the head of the screw is short, partly as a result of the fact that the thin circular base flange or washer is of such small diamter, and partly as a result of the fact that the free ends or tails of the wire clamp exert a pressure against the end of the tool socket.

SUMMARY OF THE INVENTION

The invention has, as its primary object, the provision of substantial improvements in hose clamps of the aforesaid type as a result of which the tendency of the driving tool or socket to become disengaged from the screw of the clamp is greatly reduced or minimized.

Another object of the invention is to provide a hose clamp of the character described having a screw head which is relatively long in relation to the socket of the driving tool.

A further object of the invention is to provide a hose clamp of the character described having a polygonal or hex head having a base flange or washer formed integrally with the head and stem of the screw, with the head being of enlarged diameter in relation to the hex head, whereby to provide additional bearing surface at the junction of the head and flange for the end of the driving socket.

A further object of the invention is to provide a hose clamp of the character described, wherein the base flange of the screw head is relatively thick and has a conical or chamfered surface.

A still further object of the invention is to provide a base clamp of the character described, in which the screw is made by forging or cold heading, and the head and base flange are made as large as possible, within the limits or bounds permitted by forging or cold heading.

Other objects and advantages of the invention will become more apparent and the invention itself will be best understood by reference to the following description of a preferred embodiment of the invention taken in conjunction with the accompanying drawings.

DESCRIPTION OF A PREFERRED EMBODIMENT

Figure 1:
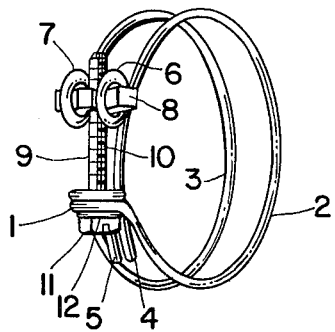
FIG. 1 is an isometric view of a wire grip hose clamp which is representative of the prior art.
Figure 2:
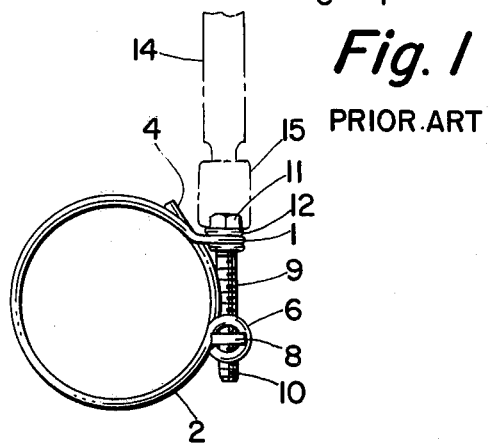
FIG. 2 is a front elevational view of the hose clamp of FIG. 1 showing a driving tool for securing the clamp to a hose.
Figure 3:
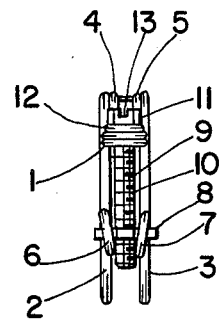
FIG. 3 is a side elevational veiw of the hose clamp of FIG. 1, as viewed from the right side of FIG. 2.
Figure 4:
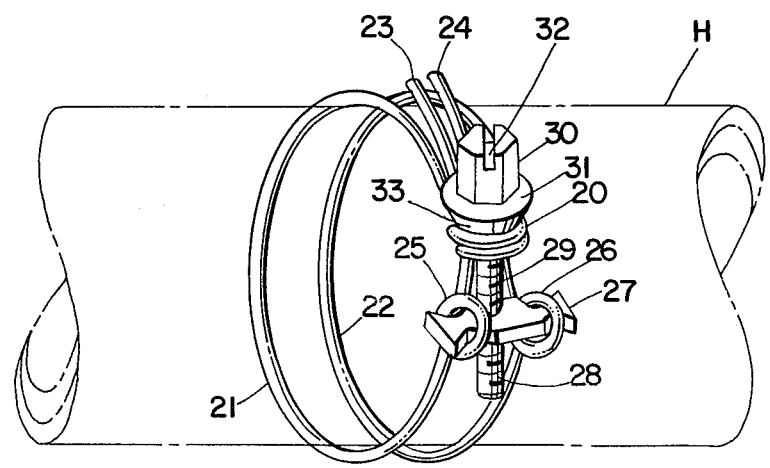
FIG. 4 is an isometric view of the hose clamp of the invention, as applied to the hose.

In FIGS. 1, 2 and 3 inclusive, a wire grip hose clamp is shown, which is representative of such wire grip clamps.

Referring more particularly to FIGS. 1, 2 and 3 of the drawings, the hose clamp is shown made from a single piece or length of wire, bent or formed at substantially its mid-point to provide a spiral wire grip loop 1, and a pair of spaced hose-gripping circular portions 2 and 3, which terminate in tails 4 and 5 which extend substantially tangentially to the portions 2 and 3.

At points spaced circumferentially from the spiral wire grip loop 1 and from the ends of the tails 4 and 5, the wire is formed to provide spaced loops 6 and 7 which provide bearings for a flat trunnion nut 8.

The hose clamp further includes a screw 9, having a threaded stem 10 which extends through the spiral wire grip loop 1, and is in threaded engagement with the trunnion nut 8. The screw is provided at one end of the stem 10 with a head 11 of hexagonal configuration and having at its base an annular flange 12, which in effect, is a part of the head. The head is provided with a screw driver slot 13.

It is to be noted the the head 11 is relatively short in length and that the base flange 12 of the head is relatively thin and of uniform thickness and of a diameter which does not exceed the distance between diametrically opposite corners of the head 11. The head 11 and base flange 12 are of a conventional size and dimension, such as found in screws used in such clamps.

For the purpose of securing the hose clamp to a hose, a driving tool 14 is used having a hexagonal socket 15 which, as shown in broken lines in FIG. 2, receives the head 11 of the screw 9 and abuts the base flange 12. The socket 15 is rotated for this purpose, to thereby secure the hose clamp to the hose.

It has been found that in thus securing the clamp to a hose, the free ends or tails 4 and 5 of the wire grip hose clamp exert pressure against the end of the tool socket 15, as they pass beneath the annular base flange 12 of the head 11 causing the socket to become disengaged from the head 11.

This tendency of the socket to become disengaged from the head 11 of the screw 9 is increased, where, as in this instance, the head 11 of the screw 9 is relatively short and the base flange 12 of the head 11 is relatively thin and of a diameter not in excess of the distance between diametrically-opposite corner of the hexagonal head 11.

Referring more particularly to FIGS. 4, 5, 6, 7 and 8 of the drawings, an improved wire grip hose clamp embodying the invention is shown.

This clamp is also made from a single piece or length of wire, bent or formed at substantially its mid-point to provide a spiral wire grip loop 20, and a pair of spaced hose gripping circular portions 21 and 22, which terminate in free ends or tails 23 and 24, which extend substantially tangentially to the portions 21 and 22.

At points spaced circumferentially from the spiral wire grip loop 20 and from the ends of the tails 23 and 24, the wire is formed to provide spaced loops 25 and 26 which provide bearings for a flat trunnion nut 27.

The hose clamp further includes a screw 28 having a threaded stem 29 which extends through the spiral wire grip loop 20, and is in threaded engagement with the trunnion nut 27.

In this instance, the screw 28 is provided at one end of the stem 29 with a head 30 of hexagonal configuration and having at its base an annular flange or washer 31 which in effect is a part of the head and abuts the loop 20. The head is provided with a screw driver slot 32.

Of particular importance is the fact that the head 30 is substantially longer than the head 11 of the screw 9; that the base flange 31 is substantially greater in diameter than the diameter of the base flange 12 of the screw 9, exceeding in diameter the distance between diametrically-opposite corners of the head 30; that the base flange has a conical or chamfered surface 33, and that the overall thickness of the base flange 31 is substantially greater than the thickness of the base flange 12 of the screw 9.

Figure 5:
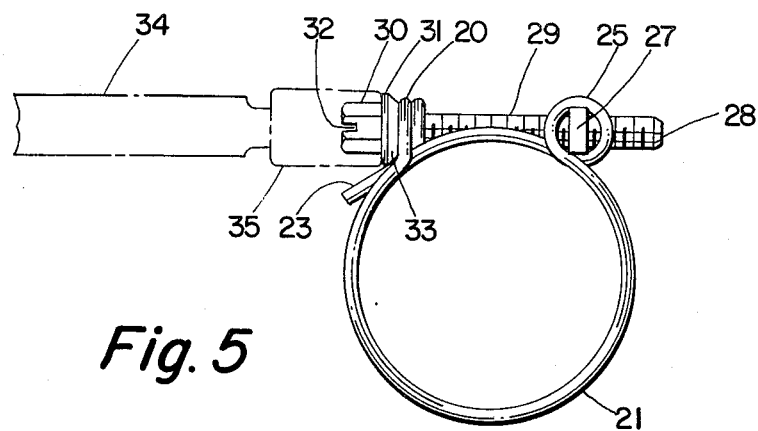
FIG. 5 is a side elevational view of the hose clamp of FIG. 4 showing the driving tool for securing the clamp to a hose.
Figure 6:
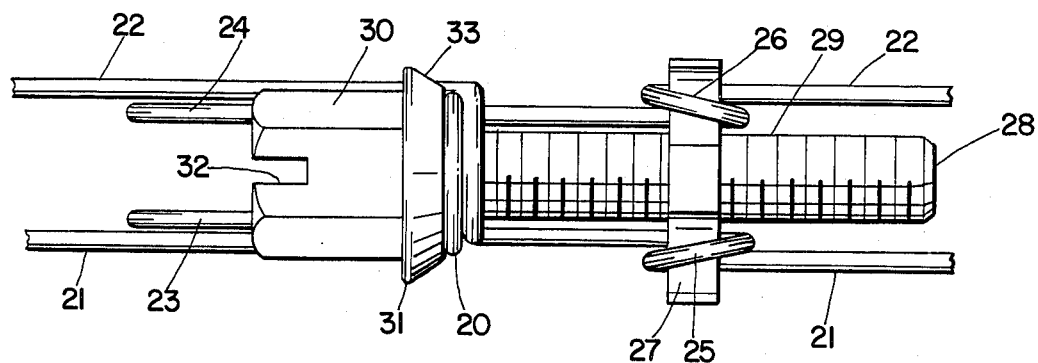
FIG. 6 is a fragmentary top plan view on an enlarged scale of the hose clamp of FIG. 5.
Figures 7, 8:
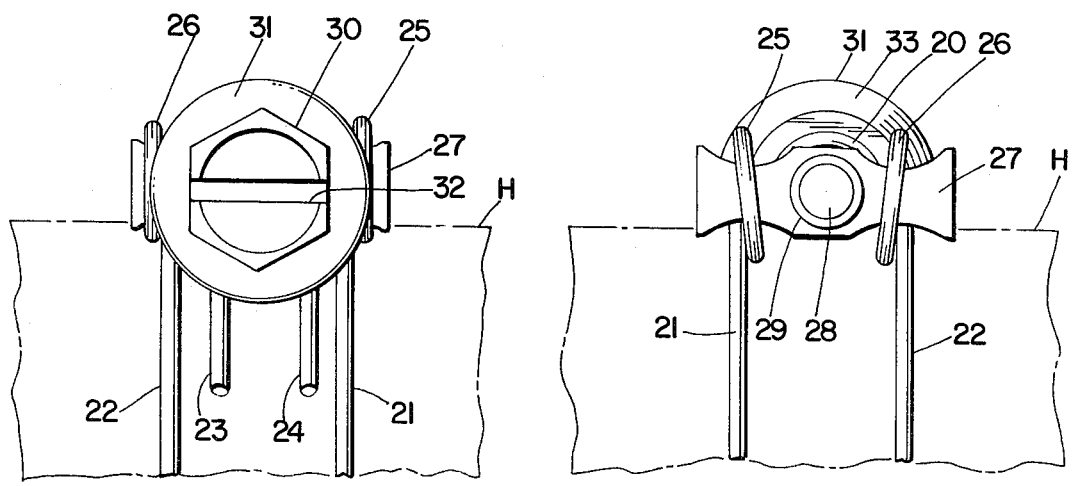
FIG. 7 is a fragmentary end elevational view of a portion of the hose clamp of FIG. 6, as viewed from the left end of FIG. 6.
FIG. 8 is a fragmentary end elevational view of a portion of the hose clamp of FIG. 6, as viewed from the right end of FIG. 6.

For the purpose of securing the hose clamp to a hose H, a tool 34 is used having a hexagonal socket 35 which, as shown in broken lines in FIG. 5, receives the head 30 of the screw 28, and abuts the base flange 31. The socket 35 is rotated for this purpose to thereby secure the hose clamp to the hose.

The design of the head and base flange of the screw 28 is advantageous in several respects.

In the first place, the longer head 30 in relation to the socket 35 of the driving tool 34 provides sufficient length to minimize the tendency of the socket from becoming disengaged from the head during use of the driving tool.

The enlarged diameter of the flange 31 provides additional bearing surface for the end of the socket 35, thus further minimizing any tendency of the socket to become disengaged from the head 30.

In the second place, the conical or chamfered surface 33 of the flange 31 acts to force the free ends or tails 23 and 24 away from the socket 35, thereby preventing these free ends or tails from causing the socket to become disengaged from the head 30, as the free ends or tails pass beneath the head of the screw during the tightening operation. In other words, the surface 33 forces these ends or tails away from the socket 35 of the driving tool, thus facilitating the installation of the clamp on the hose.

As seen most clearly in FIGS. 4–7, the enlarged base flange 31 is interposed between the free ends 23 and 24, thereby separating the free ends from each other by a distance related to the flange diameter. The spacing between the free ends represents the minimum acceptable spacing between the hose-gripping portions 21 and 22, since the free ends effectively limit axially inward movement of the hose-gripping portions 21 and 22. The base flange is of sufficient diameter to maintain the requisite separation between the free ends 23 and 24.

In the third place, the head 30 and flange 31 are made by forging or cold heading, and as large as possible within the limits or bounds permitted by forging or cold heading of the screw. The screw and its head and flange could be machined out of bar stock, but this would require removal of excessive amounts of metal, rendering unfeasible manufacture of the screw.

These improvements thus provide maximum assembly ease and convenience (on the hose or other device being clamped) within the limits or bounds of manufacturing feasibility.

It is to be understood that various changes can be made in the hose clamp within the spirit of the invention, without departing from the scope of the appended claims.

Having thus described our invention, we claim:

1. In a wire loop hose clamp having a screw adapted to be tightened by a driving tool having a rotatable socket engageable with said screw, said clamp comprising a length of wire formed to provide a spiral grip loop and a pair of spaced hose-gripping circular portions which terminate in free ends disposed between said portions and extending substantially tangentially to said portions and tending to abut and exert disengaging pressure upon said socket when said socket is engaged with said screw, a nut interconnecting said hose-gripping portions, said screw having a stem extending through said spiral grip loop into threaded engagement with said nut, said screw having a head of polygonal configuration provided with an annular base flange abutting and interposed between said free ends whereby said free ends are maintained in a spaced-apart relationship, said base flange being of substantially larger diameter than the distance between diametrically opposite corners of said head, and said diameter preferably being at least equal to the outside diameter of said socket, whereby said flange isolates said socket from said free ends and said disengaging pressure of said free ends is transferred from said socket to said flange.

2. A wire loop hose clamp as defined in claim 1, wherein said base flange is provided with a conical surface abutting said free ends, whereby said free ends are directed radially inwardly of said portions and away from said socket.

3. A wire loop hose clamp as defined in claim 2, wherein said free ends are spaced from each other to define the minimum desired spacing between said hose-gripping portions, and said base flange is of sufficient diameter to maintain the requisite separation between said free ends.

4. A wire loop hose clamp as defined in claim 2, wherein the diameter of said base flange is less than the outside diameter of said socket and said free ends exert disengaging pressure upon said socket, and wherein said screw head is elongated to provide substantial additional engagement surface for said socket, whereby said socket remains in engagement with said head when subjected to said disengaging pressure.

* * * * *